(12) United States Patent
Ramasamy et al.

(10) Patent No.: US 8,761,701 B2
(45) Date of Patent: Jun. 24, 2014

(54) SELECTIVE RECEIVE DIVERSITY IN A MOBILE WIRELESS DEVICE

(75) Inventors: Venkatasubramanian Ramasamy, San Jose, CA (US); Gaurav R. Nukala, Sunnyvale, CA (US)

(73) Assignee: APPLE Inc., Cupertino, CA (US)

( * ) Notice: Subject to any disclaimer, the term of this patent is extended or adjusted under 35 U.S.C. 154(b) by 330 days.

(21) Appl. No.: 13/182,390

(22) Filed: Jul. 13, 2011

(65) Prior Publication Data

US 2013/0017797 A1    Jan. 17, 2013

(51) Int. Cl.
*H04B 17/00* (2006.01)

(52) U.S. Cl.
USPC ........ 455/226.1; 455/133; 455/230; 455/436; 455/562.1

(58) Field of Classification Search
CPC ........... H04B 17/0042; H04B 17/0077; H04B 7/0617; H04B 7/0628; H04B 7/0689; H04B 7/0814; H04B 7/0825; H04B 7/0871
USPC ..................................................... 455/226.1
See application file for complete search history.

(56) References Cited

U.S. PATENT DOCUMENTS

| | | | |
|---|---|---|---|
| 5,203,024 A * | 4/1993 | Yamao | 455/133 |
| 5,952,963 A | 9/1999 | Shen et al. | |
| 7,555,063 B2 | 6/2009 | Sadahiro | |
| 7,610,019 B2 | 10/2009 | Moon et al. | |
| 7,729,677 B2 | 6/2010 | Saed et al. | |
| 2004/0147289 A1 | 7/2004 | Paljug et al. | |
| 2004/0242277 A1 * | 12/2004 | Kiribayashi | 455/562.1 |
| 2005/0113039 A1 | 5/2005 | Tsukamoto | |
| 2008/0064404 A1 * | 3/2008 | Zhang et al. | 455/436 |
| 2011/0134987 A1 | 6/2011 | Watanabe | |
| 2012/0142296 A1 * | 6/2012 | Cotterill et al. | 455/230 |

* cited by examiner

*Primary Examiner* — Ajibola Akinyemi
(74) *Attorney, Agent, or Firm* — Fay Kaplun & Marcin, LLP

(57) ABSTRACT

Method, apparatus and computer program product measuring signals received through multiple antennas in a mobile wireless device is described. Signals received through at least one of a primary antenna and a secondary antenna, during each cycle in a series of discontinuous reception cycles, is measured. The mobile wireless device switches between the primary and secondary antennas based on comparing the moving averages of the measured received signals to predetermined thresholds. When unable to decode successfully a signal received on the primary antenna, the mobile wireless device switches to decode signals received on the secondary antenna.

21 Claims, 15 Drawing Sheets

SELECTIVE RECEIVE DIVERSITY IN A MOBILE WIRELESS DEVICE

TECHNICAL FIELD

The present disclosure relates to controlling receive antenna diversity in a wireless mobile device, and in particular to selectively enabling and disabling of a plurality of receivers during certain states in a mobile wireless device, such as a user equipment (UE), in communication with a wireless network, such as a Universal Mobile Telecommunication System (UMTS).

BACKGROUND

A Universal Mobile Telecommunication System (UMTS) is a broadband, packet based system for the transmission of text, digitized voice, video and multi-media. In a UMTS based network, a mobile wireless device, referred to as user equipment (UE), can be in an "idle mode" or in a "connected mode." In the idle mode, the UE can request a radio resource control (RRC) connection from a wireless network to send user data to the wireless network, to initiate a voice connection and to respond to a page for receiving a voice connection or data from the wireless network. The UE can reduce battery consumption in the idle mode or connected mode by minimizing when circuits are active and by also minimizing which circuits are used while monitoring the network for connection initiation messages to which to respond. In the idle mode or the connected mode, the UE can use additional circuitry when required to improve radio reception performance. Thus a UE can trade off power consumption for improved wireless performance as required by selectively enabling and disabling power consuming circuitry in the UE.

When connected to the wireless network, the UE can be in one of four states. Each connected state can consume a different amount of power from a battery in the UE.

CELL-DCH: A dedicated channel is allocated to the UE in the uplink and downlink directions to exchange data. As the UE can be actively transmitting and receiving in the CELL-DCH state, this state can consume the most power.

CELL-FACH: No dedicated channel is allocated to the UE; instead, common channels are used to exchange a small amount of bursty data. While the UE can be limited in transmission and reception capabilities in this state, the UE can still be considered "active" continuously, albeit consuming power at a lower level than in the CELL-DCH state.

CELL-PCH: The UE can use Discontinuous Reception (DRX) to monitor broadcast messages and pages through a Paging Indicator Channel (PICH) and no uplink activity can be possible. With no uplink transmission and limited downlink reception, the UE can consume less power in this state than in the CELL-DCH and CELL-FACH states. Power consumption can also be minimized by using a minimal set of circuitry in the UE when monitoring for broadcast messages and pages.

URA-PCH: similar to CELL-PCH, except a UTRAN Registration Area (URA) UPDATE procedure is triggered through URA reselection.

When not communicating with the wireless network, the UE can conserve battery power by "sleeping" and periodically "waking" during a series of successive DRX cycles to monitor the page indicator channel for broadcast messages and pages that can indicate an incoming call or data. The UE can also receive updated wireless network system information during the "wake" portion of a DRX cycle. When "asleep", the UE can disable most active circuitry to minimize power consumption. When "awake", the UE can use limited active circuitry to also minimize power consumption and can selectively add active circuitry as required based on measured operating conditions to maintain or improve performance. During an "awake" portion of a DRX cycle, the UE can receive signals typically through one antenna connected to one receive signal chain, even when the UE can include multiple antennas and multiple receive signal chains, in order to limit current drain from the UE's battery. When located in an area of the wireless network with weak signal coverage, the UE, however, can be unable to correctly receive pages or can declare an "out of service" condition based on measurements of weak signals received through the sole operating antenna and receive signal chain. To improve signal coverage for the UE to detect pages from and to maintain connections with the wireless network, selective use of more than one antenna and receive signal chain in the UE can be implemented to balance minimizing battery power drain and increased performance. This selective use can be referred to as selective receive diversity.

Therefore, a need exists for a method and apparatus for selectively enabling and disabling one or more of a plurality of receivers during certain operating states in a mobile wireless device in communication with a wireless network.

SUMMARY OF THE DESCRIBED EMBODIMENTS

This paper describes various embodiments that relate to methods, apparatus and computer program product to control receive antenna diversity in a wireless mobile device, and in particular to selectively enabling and disabling of a plurality of receivers during certain states in a mobile wireless device, such as a user equipment (UE), in communication with a wireless network such as a Universal Mobile Telecommunication System (UMTS).

In one embodiment, a method of measuring signals received through a plurality of antennas in a mobile wireless device in communication with a wireless network is described that includes at least the following steps. In a first step, the mobile wireless device measures signals received through at least one of a primary antenna and a secondary antenna during each cycle in a series of discontinuous reception cycles. In a subsequent step, the mobile wireless device varies a switch rate that controls measuring between the primary antenna and the secondary antenna based on the measured received signals. In another step, when unable to decode successfully a signal received on the primary antenna, the mobile wireless device switches to decode signals received on the secondary antenna. In an embodiment, the mobile wireless device measures signals by calculating a moving average of signal strength for a pilot signal received through the antennas from a radio station in the wireless network. The mobile wireless device varies the switch rate based at least in part on the calculated moving averages for pilot signals received through the primary antenna. In some embodiments, the mobile wireless device compares the calculated moving averages for signals received through the antennas against pre-determined thresholds to determine the frequency of the switch rate between the primary and secondary antennas.

In one embodiment, a method for managing receiver diversity in a mobile wireless device is described that includes at least the following steps. In a first step, the mobile wireless device receives a page indicator on a page indicator channel through at least one of a first antenna and a second antenna during a series of successive page cycles. In a subsequent step, the mobile wireless device decodes the page indicator received through the first antenna for a first plurality of successive page cycles. When decoding fails for signals received through the first antenna during the first plurality of successive page cycles, the mobile wireless device decodes the page indicator received through the second antenna for a second plurality of successive page cycles. When decoding fails for signals received through the first and second antennas individually, the mobile wireless device decodes the page indicator received through both the first and second antennas together. In an embodiment, the mobile wireless device selectively enables and disables receive signal chains in the mobile wireless device based on which antennas through which signals are received by the mobile wireless device.

In one embodiment, a mobile wireless device is described. The mobile wireless device includes at least a processor, a wireless transceiver arranged to facilitate communication with the wireless network, a primary antenna connected to a first receive signal circuit; and a secondary antenna connected to a second receive signal circuit. The mobile wireless device is arranged to measure signals received through at least one of the primary antenna connected to the first receive signal circuit and the secondary antenna connected to the second receive signal circuit during each cycle in a series of discontinuous reception cycles. The mobile wireless device is also arranged to vary a switch rate that controls switching between measuring signals received through the primary antenna connected to the first receive signal circuit and through the secondary antenna connected to the second receive signal circuit based on the measured received signals. When unable to decode successfully a signal received on the primary antenna, the mobile wireless device is further arranged to switch to decode signals received on the secondary antenna.

In one embodiment, a non-transitory computer program product for storing executable computer code for measuring receive signals in a mobile wireless device in communication with a wireless network is described. The computer program product comprises at least the following computer program code. Computer program code for measuring signals received through at least one of a plurality of antennas, each antenna connected to a corresponding analog receive signal circuit. Computer program code for enabling and disabling the analog receive signal circuits based on the measured signals. Computer program code for varying a switch rate between each antenna in the plurality of antennas and between corresponding analog receive signal circuits based at least on the measured signals received from a primary antenna in the plurality of antennas.

BRIEF DESCRIPTION OF THE DRAWINGS

The described embodiments and the advantages thereof may best be understood by reference to the following description taken in conjunction with the accompanying drawings.

DETAILED DESCRIPTION OF EMBODIMENTS

Figure 1:
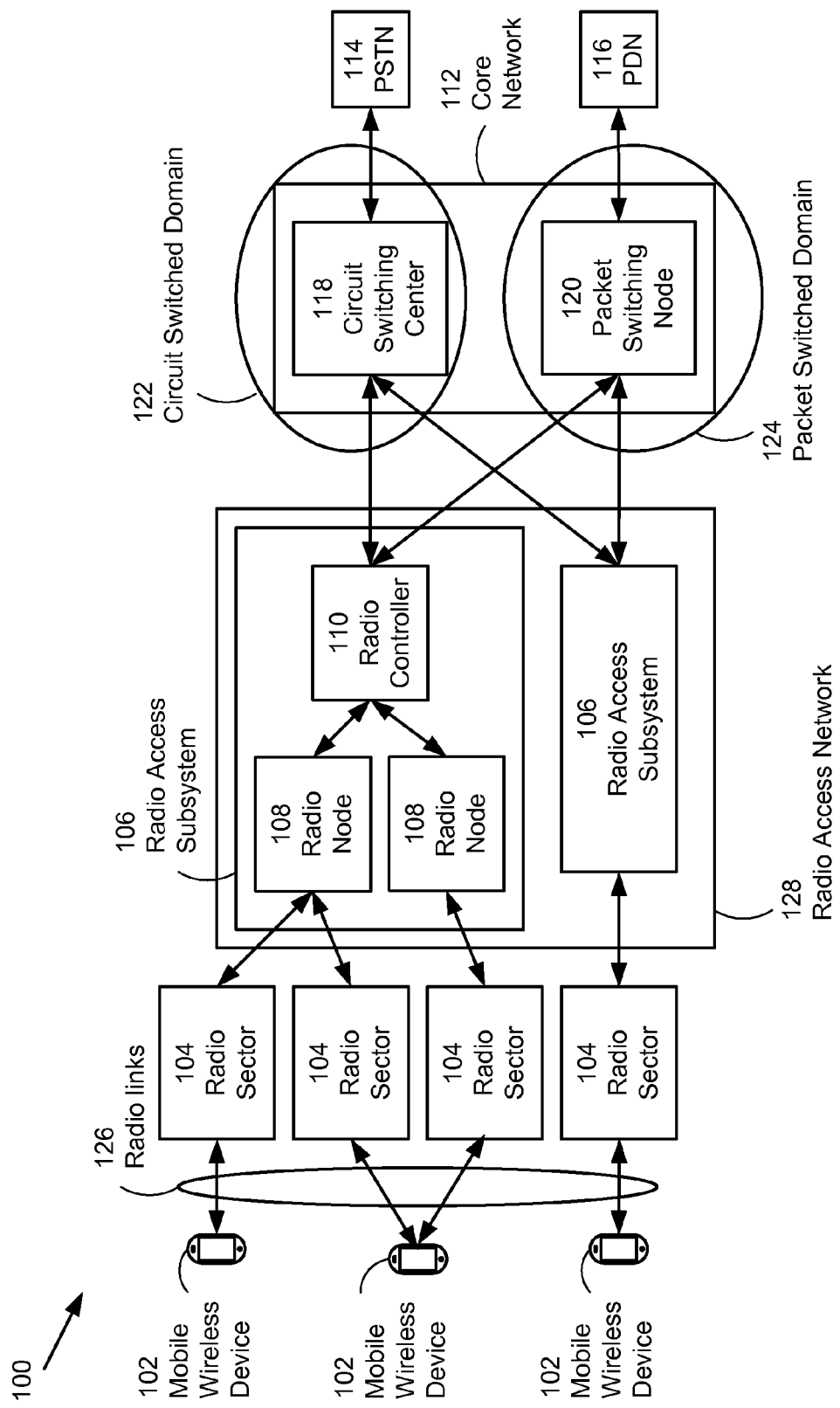
FIG. 1 illustrates representative elements of a generic wireless network.

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

The examples and embodiments provided below describe various methods and apparatuses for controlling receive antenna diversity in a wireless mobile device, and in particular to selectively enabling and disabling of a plurality of receivers during certain states in a mobile wireless device, such as a user equipment (UE), in communication with a wireless network such as a Universal Mobile Telecommunication System (UMTS). It should be understood, however, that other implementations of the same methods and apparatuses can apply to mobile wireless devices used in other types of wireless networks. For example, the same teachings could also be applied to a Code-Division-Multiple-Access (CDMA) network, Wideband-CDMA (W-CDMA) network, Long Term Evolution (LTE) network, or other network using voice and packet data wireless communications. In general, the teachings described herein can apply to a mobile wireless device operating in a wireless network based on radio access technology. The specific examples and implementations described herein are presented for simplicity in relation to UMTS networks but also can apply to other wireless network environments. For other network types besides UMTS, the network elements can be selected appropriately based on the network type.

In a particular example, the present system and method provide for varying a switch rate of signal reception between two different antennas through associated receive signal circuits in a mobile wireless device based on measured signals received at the mobile wireless device through one or more of the antennas. The mobile wireless device can receive signals through one or more antennas with associated receive signal circuits; the receive signal circuits can be selectively enabled and disabled by a processor in the mobile wireless device. Typically, the receive signal circuits can include analog receiver circuitry, such as receive amplifiers, frequency shift circuits and analog to digital converters. This analog receive circuitry can also be referred to an analog receive signal chain. When a signal strength received through a primary antenna and its associated receive signal circuitry is sufficiently high, as determined by comparing a calculated moving average of the received signal strength against a first pre-determined threshold, the mobile wireless device can select to receive signals through the primary antenna and associated receive signal circuitry. Additional antennas and associated receive signal circuitry other than the primary antenna and its associated receive signal circuitry in the mobile wireless device can be disabled in order to conserve battery power.

When the calculated moving average of the received signal strength through the primary antenna falls below the first pre-determined threshold, the mobile wireless device can enable a secondary antenna and an associated set of analog receive circuitry selectively during certain time intervals in order to measure signals through an alternate path. A moving average of received signal strength through the secondary antenna can be measured in addition to the moving average of received signal strength through the primary antenna. The secondary antenna and associated signal circuitry can be selectively enabled during one of every N successive discontinuous reception cycles. During the remaining N−1 of N successive discontinuous reception cycles, the primary antenna and associated signal circuitry can be selectively enabled, while the secondary antenna and associated signal circuitry can be selectively disabled simultaneously. Alternating between the primary antenna and secondary antenna can keep power consumption of circuitry in the mobile wireless device lower than when using full simultaneous receive diversity (which can enable both antenna and associated signal circuitry).

The mobile wireless device can calculate the moving average for received signals using pilot signals transmitted continuously by radio transmitter stations in the wireless network. Based on the calculated moving averages of received pilot signal strength, the mobile wireless device can vary the switch rate between the primary antenna and the secondary antenna during a series of discontinuous reception cycles. Switching between the antennas can provide a selective receive diversity. For higher values of the calculated moving average pilot signal strength through the primary antenna, the mobile wireless device can bias the switch rate to use the primary antenna more often than the secondary antenna. For progressively lower values of the calculated moving average pilot signal strength through the primary antenna, the secondary antenna can be used more progressively more often, until below a second pre-determined threshold, the primary and secondary antennas can be used equally. When the received signal strength is sufficiently low that correct decoding of the received signal cannot be accomplished through the primary antenna or the secondary antenna alone, both antennas can be enabled simultaneously to provide for combining signals from both antennas, thereby providing for full receive diversity.

As described above, signals from one or more antennas in a set of multiple antennas and associated receive signal circuitry can be used to improve pilot signal detection during discontinuous reception cycles for a mobile wireless device operating in a UMTS network. Discontinuous reception can be used by the mobile wireless device in any of several different operating modes, including when the mobile wireless device is in one of a CELL-IDLE mode, a CELL-PCH mode and a URA-PCH mode. Selective receiver diversity can be used to enhance reception of signals in any of these modes (or during equivalent modes having discontinuous reception in wireless networks using alternative technologies). An out of service determination and recovery there from can use signals received from a primary antenna or from a secondary antenna in the same mobile wireless device. Received signals having a higher valued moving average, i.e. higher received signal strength, can be chosen to determine when to declare an out of service condition rather than using signals with lower valued moving averages. By using stronger signals, a mobile wireless device can potentially be kept in service longer, when only one of the antennas receives a sufficiently strong signal, while other antennas receive weaker signals. When an out of service condition is triggered, more than one antenna and receive signal circuitry can be enabled simultaneously to receive signals and locate a cell with sufficiently strong signal with which to associate for further communication.

Receive diversity can also be used in a mobile wireless device to improve decoding of paging indicators received on a paging indication channel. When paging decode failures occur with one antenna, the mobile wireless device can change to another antenna to attempt to decode the paging indicators through one or more of the antennas before determining that a connection with the wireless network has been lost. A primary antenna can be used first for page indicator decoding, followed by a secondary antenna, followed by both antennas. Alternatively an antenna having the strongest signal (based on previous measurements of received signal strength) can be used before trying other antennas or combinations of antennas.

These and other embodiments are discussed below with reference to FIGS. 1-15. However, those skilled in the art will readily appreciate that the detailed description given herein with respect to these figures is for explanatory purposes only and should not be construed as limiting.

FIG. 1 illustrates a representative generic wireless communication network 100 that can include multiple mobile wireless devices 102 connected by radio links 126 to radio sectors 104 provided by a radio access network 128. Each radio sector 104 can represent a geographic area of radio coverage emanating from an associated radio node 108 using a radio frequency carrier at a selected frequency. Radio sectors 104 can have different geometric shapes depending on antenna configuration, such as emanating in an approximate circle or hexagon from a centrally placed radio node 108 or cone shaped for a directional antenna from a corner placed radio node 108. Radio sectors 104 can overlap in geographic area coverage so that the mobile wireless device 102 can receive signals from more than one radio sector 104 simultaneously. Each radio node 108 can generate one or more radio sectors 104 to which the mobile wireless device 102 can connect by one or more radio links 126. In some wireless networks 100, the mobile wireless device 102 can be connected to more than one radio sector 104 simultaneously. The multiple radio sectors 104 to which the mobile wireless device 102 is connected can emanate from a single radio node 108 or from separate radio nodes 108 that can share a common radio controller 110. A group of radio nodes 108 together with the associated radio controller 110 can be referred to as a radio access subsystem 106. Typically each radio node 108 in a radio access subsystem 106 can include a set of radio frequency transmitting and receiving equipment mounted on an antenna tower, and the radio controller 110 connected to the radio nodes 108 can include electronic equipment for controlling and processing transmitted and received radio frequency signals. The radio controller 110 can manage the establishment, maintenance and release of the radio links 126 that connect the mobile wireless device 102 to the radio access network 128.

The radio access network 128, which provides radio frequency air link connections to the mobile wireless device 102, connects also to a core network 112 that can include a circuit switched domain 122, usually used for voice traffic, and a packet switched domain 124, usually used for data traffic. Radio controllers 110 in the radio access subsystems 106 of the radio access network 128 can connect to both a circuit switching center 118 in the circuit switched domain 122 and a packet switching node 120 in the packet switched domain of the core network 112. The circuit switching center 118 can route circuit switched traffic, such as a voice call, to a public switched telephone network (PSTN) 114. The packet switching node 120 can route packet switched traffic, such as a "connectionless" set of data packets, to a public data network (PDN) 116.

Figure 2:
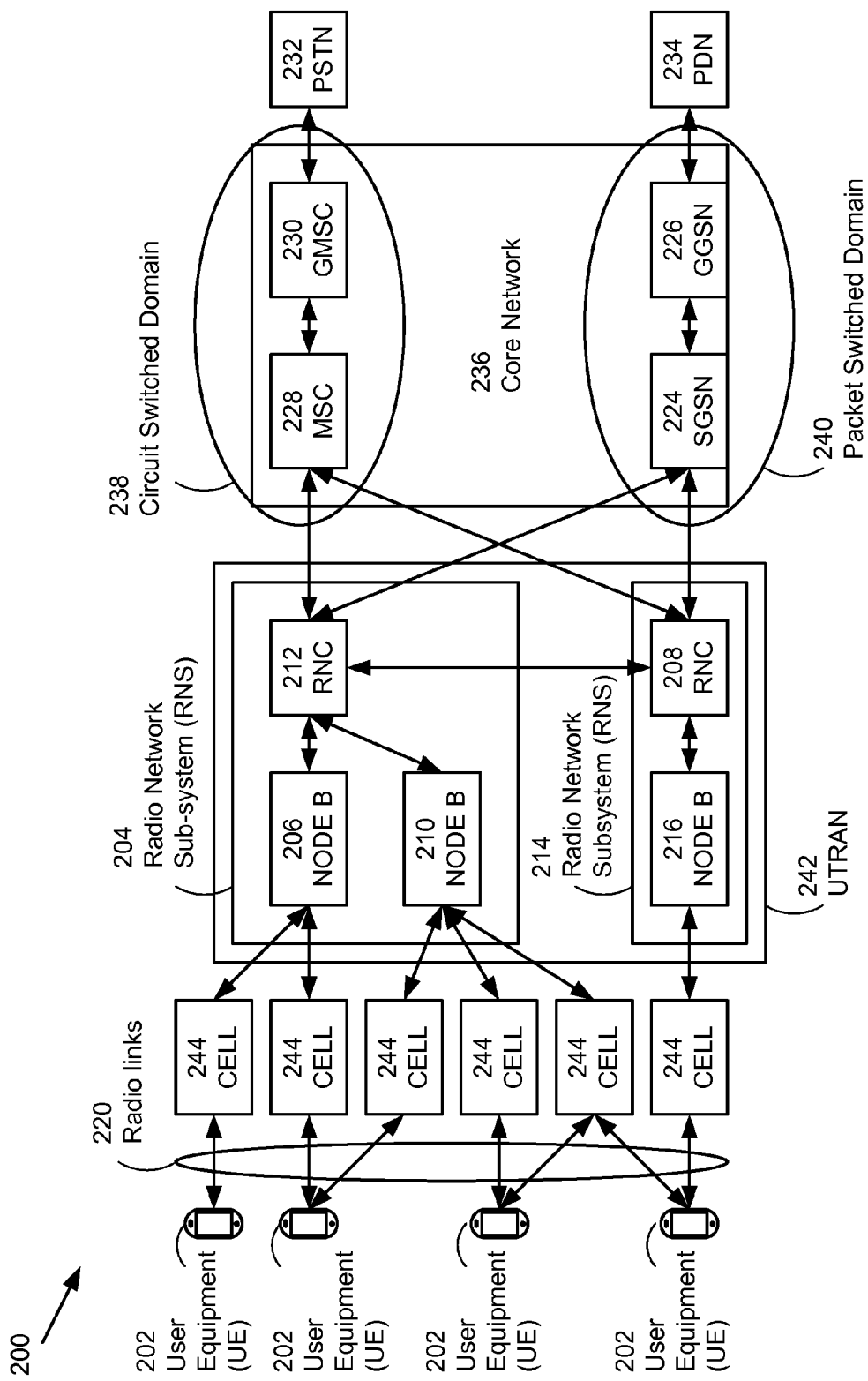
FIG. 2 illustrates representative elements of a UMTS wireless network.

FIG. 2 illustrates a representative UMTS wireless communication network 200 that can include one or more user equipment (UE) 202 that can communicate with a UMTS terrestrial radio access network (UTRAN) 242 that can connect to a core network (CN) 236. The core network 236 can include a circuit switched domain 238 that can connect the UE 202 to a public switched telephone network (PSTN) 232 and a packet switched domain 240 that can connect the UE 202 to a packet data network (PDN) 234. The UTRAN 242 can include one or more radio network sub-systems (RNS) 204/214 each of which can include a radio network controller (RNC) 208/212 and one or more Node-Bs (base stations) 206/210/216 managed by a corresponding RNC. The RNC 208/212 within the UTRAN 242 can be interconnected to exchange control information and manage packets received from and destined to the UE 202. Each RNC 208/212 can handle the assignment and management of radio resources for the cells 244 through which the UE 202 connect to the wireless network 200 and can operate as an access point for the UE 202 with respect to the core network 236. The Node-B 206/210/216 can receive information sent by the physical layer of UE 202 through an uplink and transmit data to UE 202 through a downlink and can operate as access points of the UTRAN 242 for UE 202.

UTRAN 242 can construct and maintain a radio access bearer (RAB) for communication between UE 202 and the core network 236. In the described embodiments, the services provided to a specific UE 202 can include circuit switched (CS) services and packet switched (PS) services. For example, a general voice conversation can be transported through a circuit switched service, while a Web browsing application can provide access to the World Wide Web (WWW) through an internet connection that can be classified as a packet switched (PS) service. To support circuit switched services, the RNC 208/212 can connect to the mobile switching center (MSC) 228 of core network 236, and MSC 228 can be connected to gateway mobile switching center (GMSC) 230, which can manage connections to other networks, such as the PSTN 232. To support packet switched services, the RNC 208/212 can also be connected to serving general packet radio service (GPRS) support node (SGSN) 224, which can connect to gateway GPRS support node (GGSN) 226 of core network 236. SGSN 224 can support packet communications with the RNC 208/212, and the GGSN 226 can manage connections with other packet switched networks, such as the PDN 234. A representative PDN 234 can be the "Internet".

Figure 3:
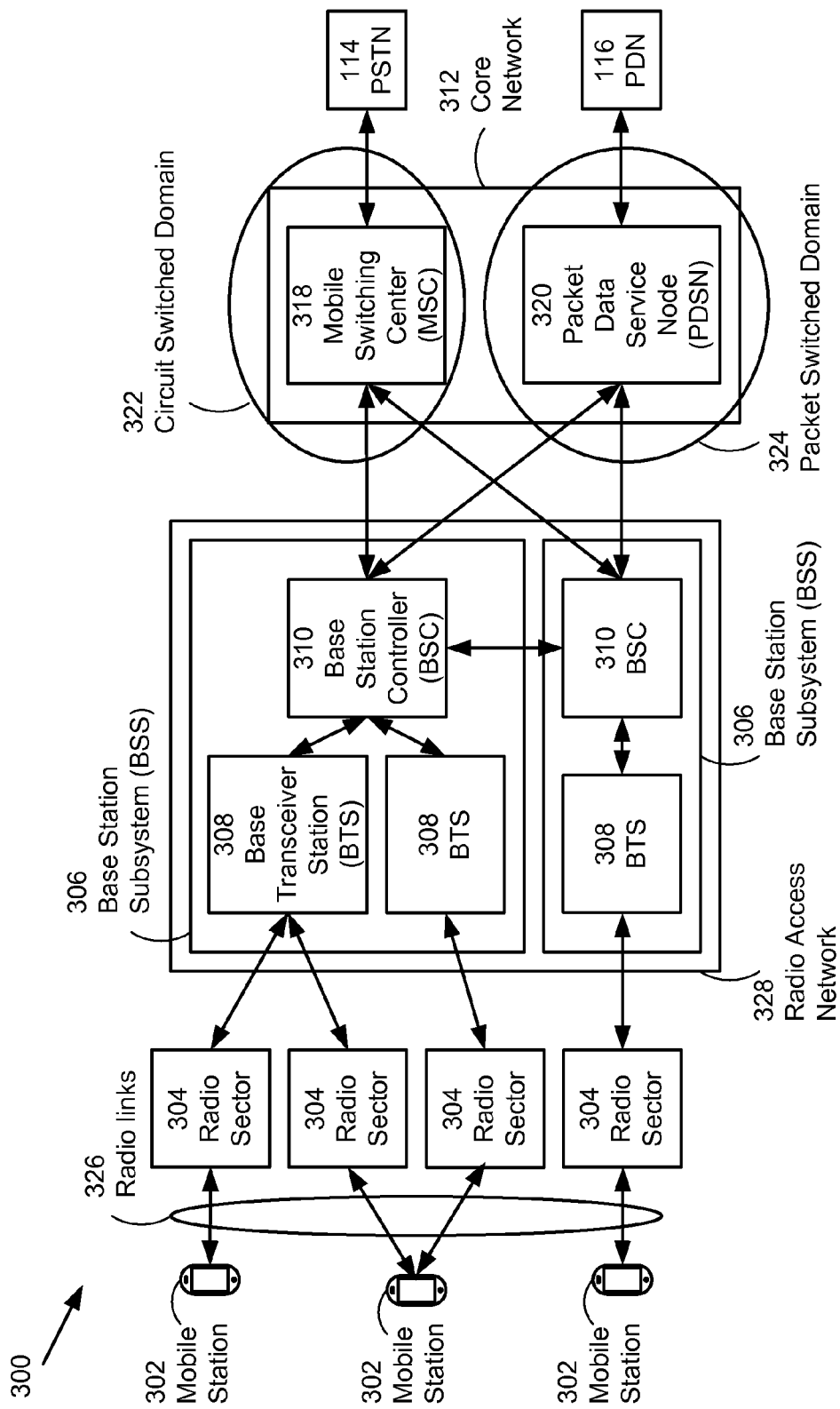
FIG. 3 illustrates representative elements of a CDMA2000 network.

FIG. 3 illustrates a representative CDMA2000 wireless network 300 that can include elements comparable to those described earlier for the generic wireless network 100 and the UMTS wireless network 200. Multiple mobile stations 302 can connect to one or more radio sectors 304 through radio frequency links 326. Each radio sector 304 can emanate from a base transceiver station (BTS) 308 that can connect to a base station controller (BSC) 310, together forming a base station subsystem (BSS) 306. Multiple base station subsystems 306 can be aggregated to form a radio access network 328. Base station controllers 310 in different base station subsystems 306 can be interconnected. The base station controllers 310 can connect to both a circuit switched domain 322 that use multiple mobile switching centers (MSC) 318 and a packet switched domain 324 formed with packet data service nodes (PDSN) 320, which together can comprise a core network 312 for the wireless network 300. As with the other wireless networks 100/200 described above, the circuit switched domain 322 of the core network 312 can interconnect to the PSTN 114, while the packet switched domain 324 of the core network 312 can interconnect to the PDN 116.

Figure 4:
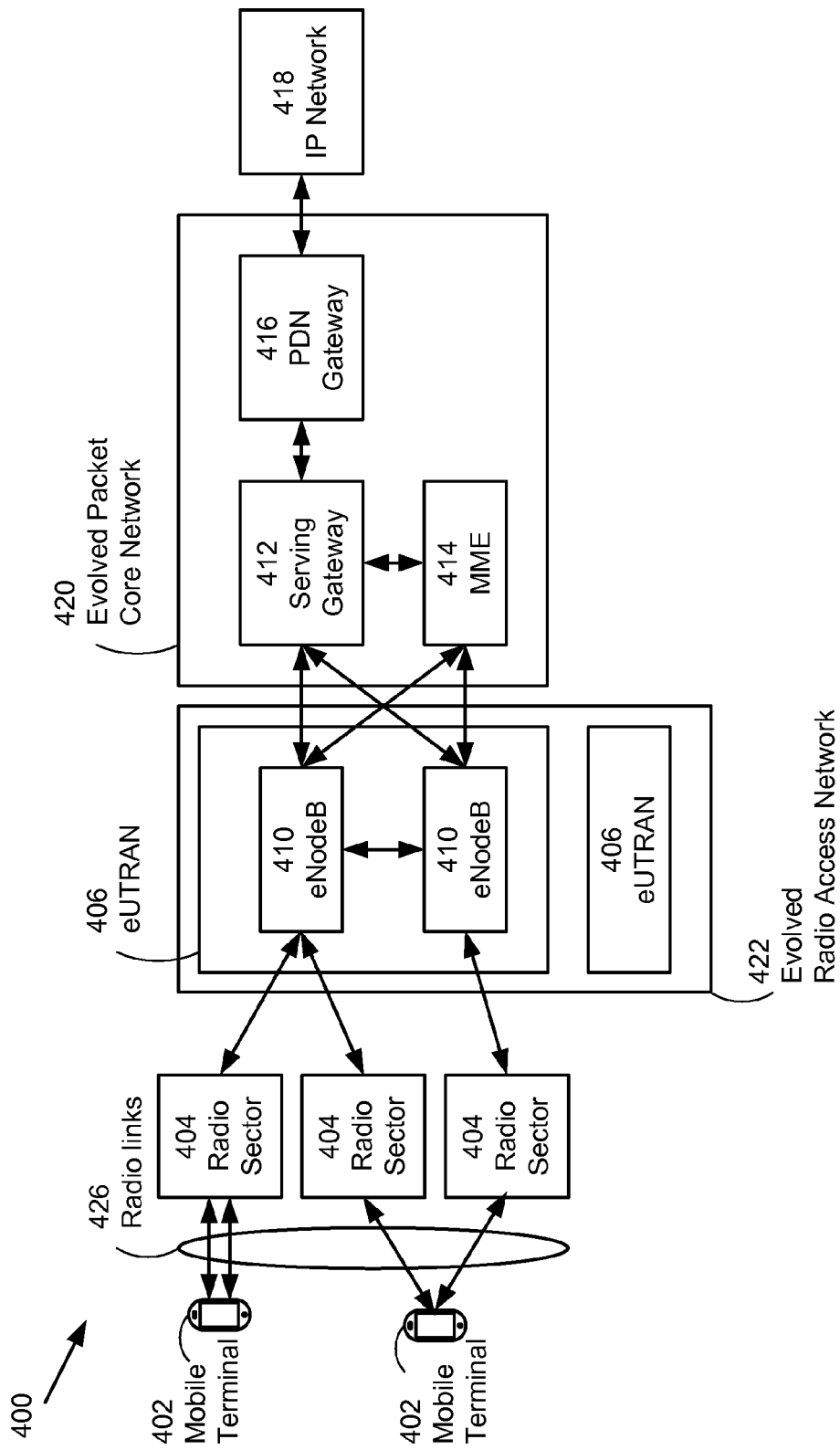
FIG. 4 illustrates representative elements of an LTE network.

FIG. 4 illustrates a representative Long Term Evolution (LTE) wireless network 400 architecture designed as a packet switched network exclusively. A mobile terminal 402 can connect to an evolved radio access network 422 through radio links 426 associated with radio sectors 404 that emanate from evolved Node B's (eNodeB) 410. The eNodeB 410 includes the functions of both the transmitting and receiving base stations (such as the Node B 206 in the UMTS network 200 and the BTS 308 in the CDMA2000 network 300) as well as the base station radio controllers (such as the RNC 212 in the UMTS network 200 and the BSC 310 in the CDMA2000 network 300). The equivalent core network of the LTE wireless network 400 is an evolved packet core network 420 including serving gateways 412 that interconnect the evolved radio access network 422 to public data network (PDN) gateways 416 that connect to external internet protocol (IP) networks 418. Multiple eNodeB 410 can be grouped together to form an evolved UTRAN (eUTRAN) 406. The eNodeB 410 can also be connected to a mobility management entity (MME) 414 that can provide control over connections for the mobile terminal 402.

Figure 5:
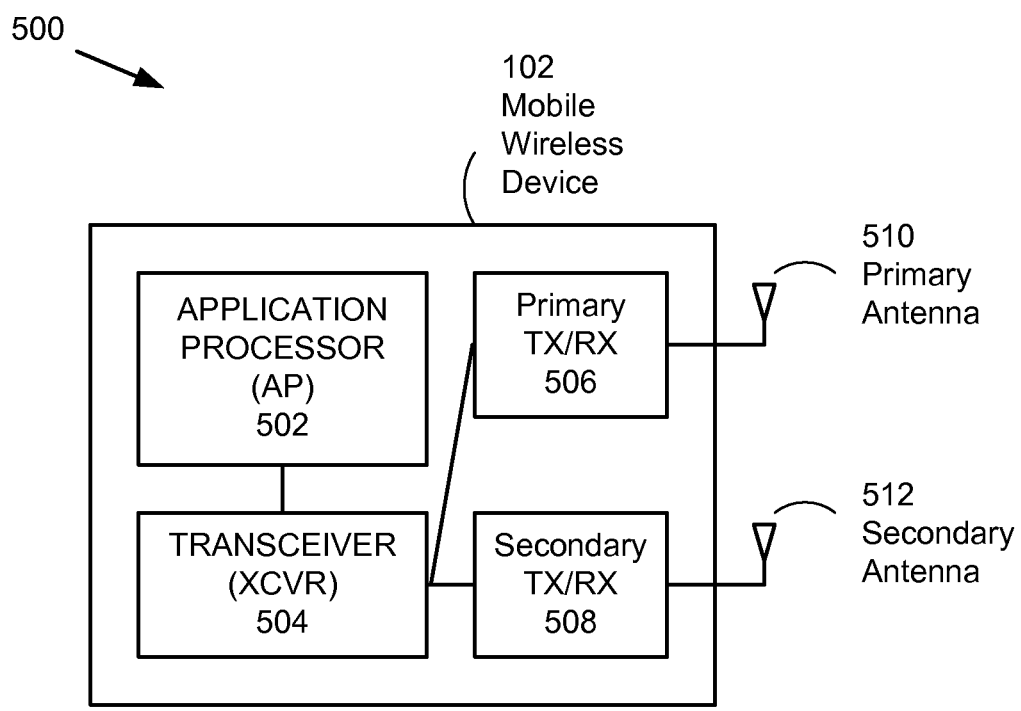
FIG. 5 illustrates select components of a mobile wireless device.

FIG. 5 illustrates select representative processing elements 500 for a mobile wireless device 102 including an application processor (AP) 502 connected to a transceiver (XCVR) 504. The AP 502 can initiate and terminate voice and data connections for the mobile wireless device 102 with the wireless network 100. The AP 502 can also manage the monitoring and maintenance of active connections of the mobile wireless device 102 with the wireless network 100, as well as assess operational conditions and performance parameters to determine the use of receive diversity to enhance operating characteristics of the mobile wireless device 102. The XCVR 504 can connect to multiple transmit and receive signal processing circuitry, typically analog circuitry, that can transform a discrete digital data representation (including digitized voice) to and from a continuous analog radio frequency signal representation suitable for transmission over radio links 126 with the wireless network 100. A primary transmit and receive (TX/RX) signal chain (circuitry) 506 can connect the XCVR 504 to a primary antenna 510. Similarly a secondary transmit and receive signal chain 508 can connect the XCVR 504 to a secondary antenna 512. The primary antenna 510 and the secondary antenna 512 can be located at different physical positions in (or on) a casing of the mobile wireless device 102, thereby providing different reception capabilities at the different antennas for various orientations of the mobile wireless device 102. Received radio frequency signals that can appear weak at one antenna can simultaneously appear stronger at another antenna, therefore parallel processing of received radio frequency signals through both the primary antenna 510 and the secondary antenna 512 can provide improved performance compared with reception through only one particular antenna alone. Receive diversity in a mobile wireless device 102 can offer a substantial performance advantage in areas (i.e. portions of a wireless network) with weak signal coverage.

Receive diversity that uses multiple receive signal chains, such as primary TX/RX 506 and secondary RX/TX 508 illustrated in FIG. 5, operating simultaneously can consume significantly more power from a battery in the mobile wireless device 102 than a single receive signal chain alone. In particular during certain operating states intended for low (or at least lower) power consumption, such as CELL-IDLE, CELL-PCH and URA-PCH states, it can be preferred to limit use of receive diversity until required to balance power consumption and receive signal strength. When operating the mobile wireless device 102 in areas of strong received signals, the AP 502 can use one receive signal chain, such as the primary TX/RX 506 or the secondary TX/RX 508 alone. Typically the primary TX/RX 506 can be designated as a default receive signal chain. When operating the mobile wireless device 102 in areas of weaker received signals, the AP 502 can determine which of multiple receive signal chains provides the strongest signal and use that signal chain. The mobile wireless device 102 can monitor performance periodically through the different signal chains to determine performance variation and potential benefits to use alternate signal chains (or to use multiple signal chains simultaneously). When received signals are weak through all receive signal chains alone, signals can be combined from multiple receive signal chains to provide improved performance to the mobile wireless device 102. Multiple receive signal chains, however, can consume significantly more battery power, so receive diversity can be used selectively when conditions warrant rather than persistently as a power draining default configuration.

Figure 6:
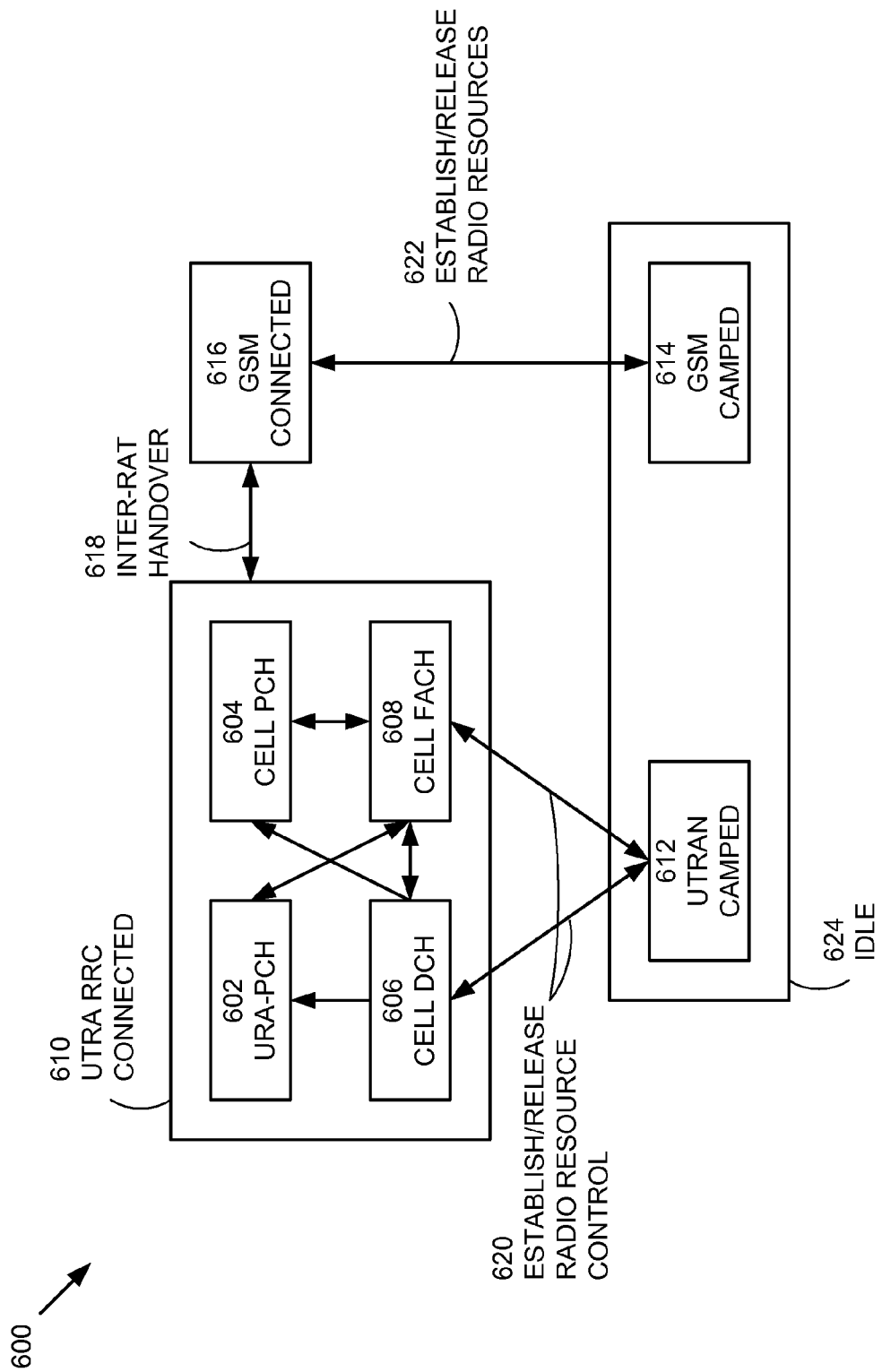
FIG. 6 illustrates a mobile wireless device state change diagram in accordance with the described embodiments.

FIG. 6 illustrates a state transition diagram 600 having several states for the radio resource control (RRC) portion of a protocol stack for a UE 202 in a combined UMTS/GSM network. The UE 202 can be in an unconnected IDLE state 624, in a UTRA RRC connected state 610 or in a GSM connected state 616. In IDLE state 624, UE 202 can request an RRC connection to establish radio resources for communication with a wireless network whenever data is available to exchange between UE 202 and the UTRAN 242. Establishing the RRC connection can occur when an application on UE 202 requires a connection to send data or retrieve data from the network, when initiating a mobile voice connection, and when terminating a connection for the UE 202 after receiving a page on a paging channel from the UTRAN 242 or SGSN 224 indicating data available from an external data network. Once UE 202 has sent a request to UTRAN 242 to establish a radio connection, UTRAN 242 can choose a state for the RRC connection. The UTRA RRC connected state can include four separate states, CELL_DCH state 606, CELL_FACH state 608, CELL_PCH state 604 and URA_PCH state 602.

From a UTRAN "camped" state 612 in the IDLE state 624, UE 202 can transition to the CELL_FACH state 608, in which it can make an initial data transfer, subsequent to which the wireless network can determine which RRC connected state to use for continued data transfer. The wireless network can move UE 202 into the Cell Dedicated Channel (CELL_DCH) state 606 or keep UE 202 in the Cell Forward Access Channel (CELL_FACH) state 608. In CELL_DCH state 606, a dedicated channel can be allocated to UE 202 for both uplink and downlink to exchange data. The CELL_DCH state 606, with a dedicated physical channel allocated to UE 202, can typically consume more battery power from UE 202 than the other states, and significantly more battery power than the IDLE state 624. Alternatively, rather than place the UE 202 in the CELL_DCH state, UTRAN 242 can maintain UE 202 in a CELL_FACH state 608. In a CELL_FACH state 608 no dedicated channel can be allocated to UE 202. Instead, common channels can be used to send signaling in relatively small bursts of data. However, UE 202 can continue to monitor common channels in the CELL_FACH state 608, and therefore the UE 202 can consume more battery power than in select alternative states, namely CELL_PCH state 604 and URA_PCH state 602, as well as compared to IDLE state 624.

Figure 7:
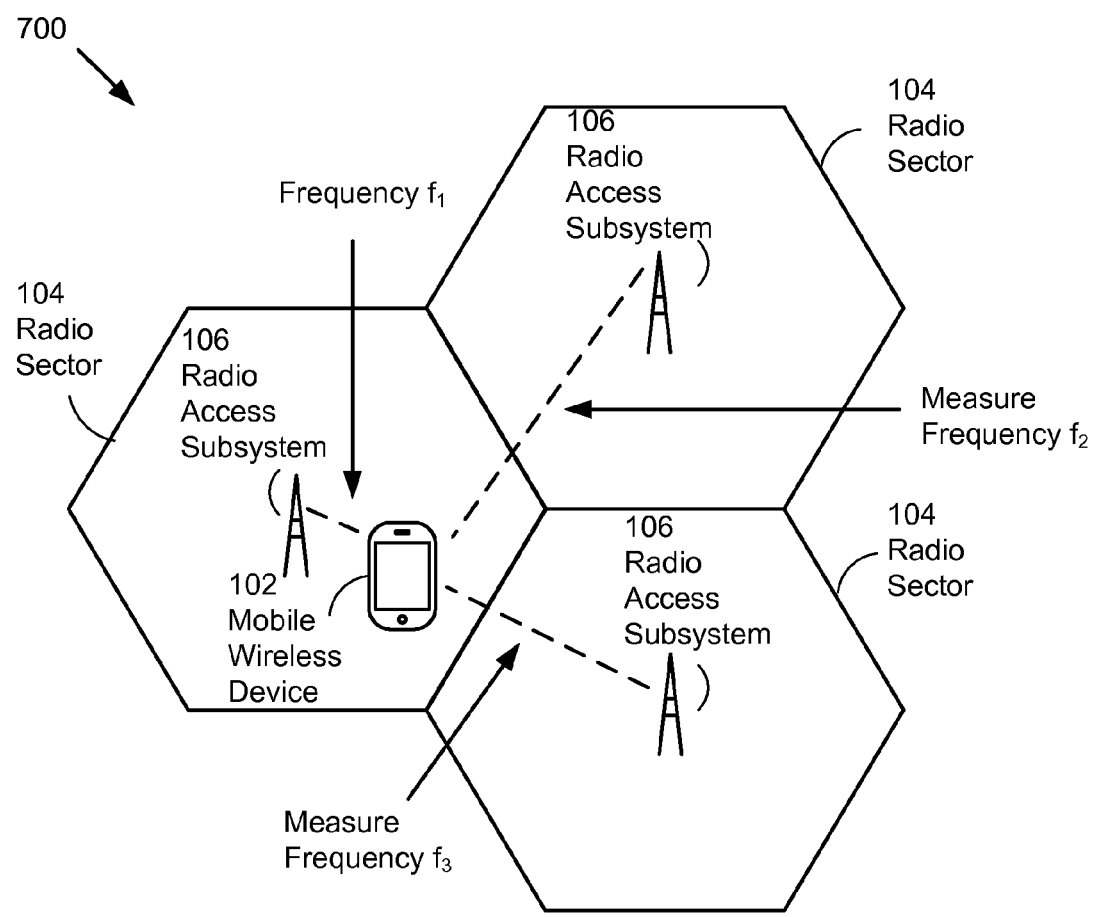
FIG. 7 illustrates a mobile wireless device measuring pilot signals received from multiple radio sectors in a wireless network.

FIG. 7 illustrates the mobile wireless device 102 in a wireless network 700 having multiple radio sectors 104. The mobile wireless device 102 can receive signals from multiple radio access subsystems 106, each radio access subsystem generating a separate radio sector 104. Each of the radio sectors 104 can use a different radio frequency carrier and/or a different scrambling code, and the mobile wireless device 102 can measure the signal strength received from each radio sector 104 to determine to which radio sector 104 to connect. Signals received from a radio access subsystem 106 closer to the mobile wireless device 102 can typically arrive with stronger signal strength, while signals received from a radio access subsystem 106 in a more distant radio sector 104 can arrive with weaker signal strength. As the mobile wireless device 102 moves throughout the wireless network 700 the signal strength from various radio access subsystems 106 can vary, and the mobile wireless device 102 can measure the received signal strengths periodically and can rank a list of radio sectors to which the mobile wireless device 102 can connect.

In an IDLE state 624, CELL_PCH 604 state or a URA_PCH state 602, the mobile wireless device 102 can use a discontinuous reception (DRX) cycle to reduce power consumption. During each DRX cycle, the mobile wireless device 102 can "awaken" from a "sleep" mode, can acquire the radio sector 104 on which it can be "camped" (i.e. associated previously), and can monitor a paging indicator channel for any paging messages that indicate an incoming voice call or pending data to receive. In areas of weak receive signal strength, decoding of the paging channel by the mobile wireless device 102 can fail. In this case, receiving signals through an alternate path, such as through a secondary antenna and secondary receive signal chain rather than through the default primary antenna and primary receive signal chain can provide an additional opportunity to receive a stronger signal and potentially correctly decode the paging channel.

During a DRX cycle, the mobile wireless device 102 can also measure neighbor radio sectors 104 (i.e. radio sectors 104 different from the radio sector 104 on which the mobile wireless device 102 can be currently camped or connected). Measurements of signals from each of the radio sectors 104 can be based on receiving a common pilot channel (CPICH) transmitted continuously by the radio access subsystem 106 that generates the corresponding radio sector 104. Typical power measurements can include a received signal code power (RSCP) and a signal to noise/interference ratio (Ec/No or Ec/Io). To minimize power consumption, the mobile wireless device 102 can perform the neighbor radio sector 104 measurements using a default primary antenna and primary receive signal chain. When the signals received through the primary antenna and primary receive signal chain are weak, the mobile wireless device 102 can measure through a secondary antenna and secondary receive signal chain, switching between the primary and secondary antennas for different DRX cycles as described further below. In addition, simultaneous use of both antennas can provide additional receive diversity measurements. The selective use of multiple antennas, receive signal chains and receive diversity can be applied to both paging channel decoding and radio sector pilot channel measurements.

Figure 8:
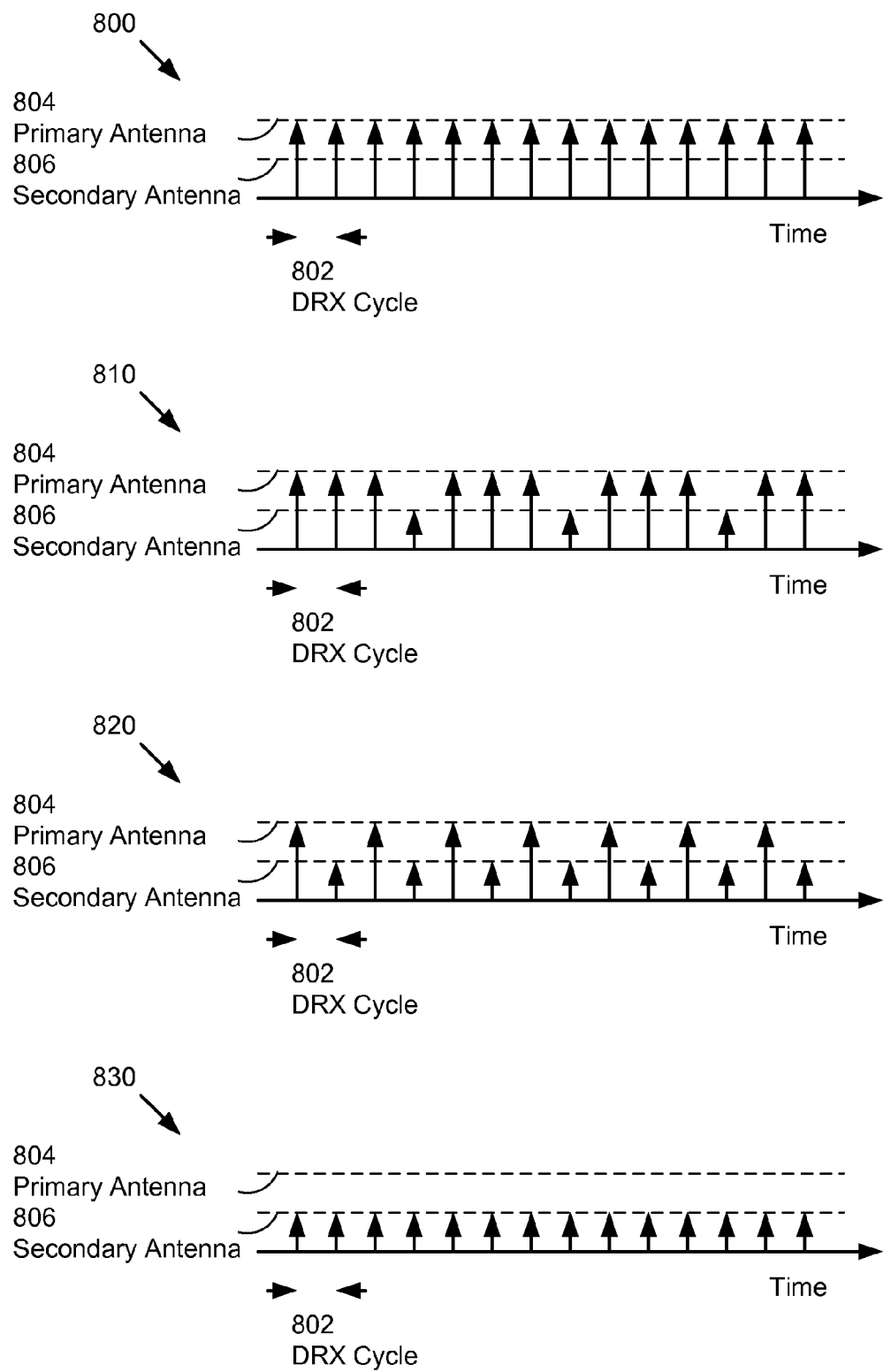
FIG. 8 illustrates representative switch rates between two antennas in a mobile wireless device using selective receive diversity.

FIG. 8 illustrates different rates of switching between two different antennas (and associated receive signal chains) in a mobile wireless device 102 for a series of successive DRX cycles 802. Initially as indicated in switch pattern 800, the mobile wireless device 102 can use a primary antenna 804 during each DRX cycle 802. During a DRX cycle 802, the mobile wireless device 102 can measure received signal strength on a common pilot channel as well as listen for paging indication messages on a paging indicator channel. The primary antenna 804 can be used by the mobile wireless device 102 when the measured signal strength through the primary antenna 804 exceeds a first pre-determined threshold value. The secondary antenna 806 can be not required when the measured received signal strength through the primary antenna 804 is sufficiently strong. Measurements of received signal strength through an antenna can be averaged over a moving window of DRX cycles, and thus an average received signal strength, rather than an instantaneous signal strength, can be used to determine a rate of switching between different antennas in the mobile wireless device 102.

When the measured signal strength through the primary antenna 804 falls below the first pre-determined threshold, the mobile wireless device 102 can measure the received signal strength through the secondary antenna 806 and an associated secondary receive signal chain. The mobile wireless device 102 can be physically oriented such that signals can be received more strongly through one antenna than another antenna located at different positions in or on the mobile wireless device 102. For example, the primary antenna 804 can be at least partially blocked, while a secondary antenna 806 can be open to signal reception. The secondary antenna 806 can be enabled during certain DRX cycles while the primary antenna 804 can be enabled during other DRX cycles. Thus, the mobile wireless device 102 can switch reception between the primary antenna 804 and the secondary antenna 806. As illustrated by the switch pattern 810, the mobile wireless device 102 can switch to use the secondary antenna 804 one out of every N=4 DRX cycles 802. The rate of switching between the primary antenna 804 and the secondary antenna 806 can vary based on the measured received signal strength. In particular, the switch rate can depend on the measured received signal strength for the primary antenna 804. As the measured signal strength received through the primary antenna 804 decreases below the first pre-determined threshold, the mobile wireless device 102 can increase the frequency of measuring through the secondary antenna 806. Thus the value of N can decrease as the measured signal strength received through the primary antenna 804 decreases, thereby increasing the frequency of measuring through the secondary antenna 806.

When the measured signal strength received through the primary antenna 804 drops below a second pre-determined threshold, the mobile wireless device 102 can alternate equally between measuring through the primary antenna 804 and through the secondary antenna 806 as illustrated by the switch pattern 820. In an embodiment, the mobile wireless device 102 can vary a switch rate between the primary antenna 804 and the secondary antenna 806 to use the primary antenna 804 between 100% (i.e. entirely) to 50% (i.e. equally use the two antennas). In another embodiment, depending on the received signal strength through the antennas, the mobile wireless device 102 can use the primary antenna up to 100% or can use the secondary antenna up to 100% and thus can vary the use of the primary antenna between 100% and 0%. The switch pattern 830 illustrates a use of the secondary antenna for 100% of the DRX cycles 802. In some embodiments, the mobile wireless device 102 can use the primary antenna between 100% and 50% for a range of measured received primary antenna signal strength; the mobile wireless device 102 can then switch to using the secondary antenna for 100% when decoding of signals received through the primary antenna is approximately zero.

Figure 9:
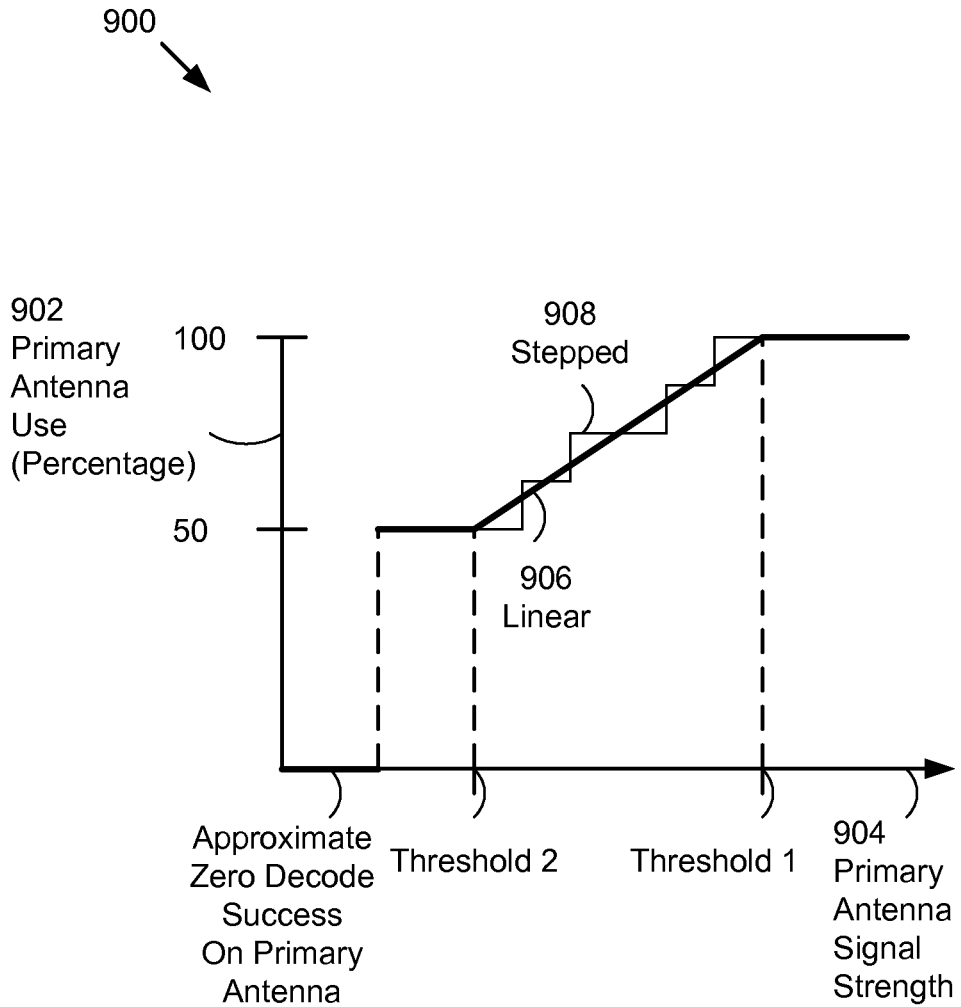
FIG. 9 illustrates a relationship between a percentage frequency of use of a primary antenna against a measured signal strength received through the primary antenna.

FIG. 9 illustrates a graph 900 that relates measured primary antenna signal strength 904 to a primary antenna percentage of use 902. The measured primary antenna signal strength 904 can be a calculated moving average of a pilot signal received by the mobile wireless device 102 determined during wake periods of a DRX cycle. When the measured primary antenna signal strength 904 exceeds a first level "Threshold 1", the mobile wireless device 102 can use the primary antenna at 100% and the secondary antenna at 0%. For measured primary antenna signal strength 904 values between a second level "Threshold 2" and the first level "Threshold 1", the mobile wireless device 102 can alternate between use of the primary antenna and the secondary antenna during different DRX cycles. The switch rate between the primary antenna and the secondary antenna can vary based on the value of the measured primary antenna signal strength 904. As shown in FIG. 9, the primary antenna use percentage 902 can decrease linearly (curve 906) from a 100% use at a primary antenna signal strength 904 value of Threshold 1 to a 50% use at a primary antenna signal strength 904 value of Threshold 2. Alternative mappings between the primary antenna signal strength 904 and the primary antenna use percentage 902 can also be used, such as a stepped curve 908 as shown in FIG. 9. When the measured primary antenna signal strength 904 drops below the second level Threshold 2, the primary antenna use percentage 902 can be 50%, in which case the mobile wireless device 102 can alternate equally between using the primary antenna and using the secondary antenna. When decoding success using signals received on the primary antenna is approximately zero, the mobile wireless device 102 can switch to using the secondary antenna 100%, i.e. primary antenna use 902 can drop to 0% when signals from the primary antenna can be unreliable.

When a mobile wireless device 102 loses service, i.e. cannot associate with any radio sector 104 in a wireless network 100, an "out of service" condition can be determined. The mobile wireless device 102 can determine "out of service" initially upon a power on startup and also when awakening during a DRX cycle and being unable to locate a radio sector with which it can have been associated. The out of service condition can be determined based on one or more measurements by the mobile wireless device 102 that can span a period of time. For a mobile wireless device 102 with multiple antennas, the mobile wireless device 102 can choose which of the multiple antennas to use for measuring to determine an out of service condition. Whichever antenna provides a strongest average received signal power can be used for determining out of service conditions. Thus, when signals received through a primary antenna weaken and a secondary antenna provides a stronger received signal, the secondary antenna can be used rather than the primary antenna when determining an out of service condition. With this implementation, an out of service condition can be avoided in circumstances when an alternative antenna provides sufficient signal strength, rather than relying only on the primary antenna to determine an out of service condition.

When an out of service condition is determined, the mobile wireless device 102 can enable full receive diversity, i.e. multiple antennas and receive signal chains can be used together, which can provide for a quicker location of a suitable radio sector with which to associate and/or connect. In an embodiment, the mobile wireless device 102 can enable full receive diversity that uses multiple antennas and receive signal chains only when correlation of received signals used to detect a radio sector fall below a predetermined threshold. Thus, the mobile wireless device 102 can initially use one of the antennas during an out of service condition, or can cycle through each of multiple antennas, which can minimize power consumption during the radio sector search. Subsequently, the mobile wireless device 102 can use multiple antennas and associated receive signal chains when no single antenna can provide sufficient signal strength.

Figure 10:
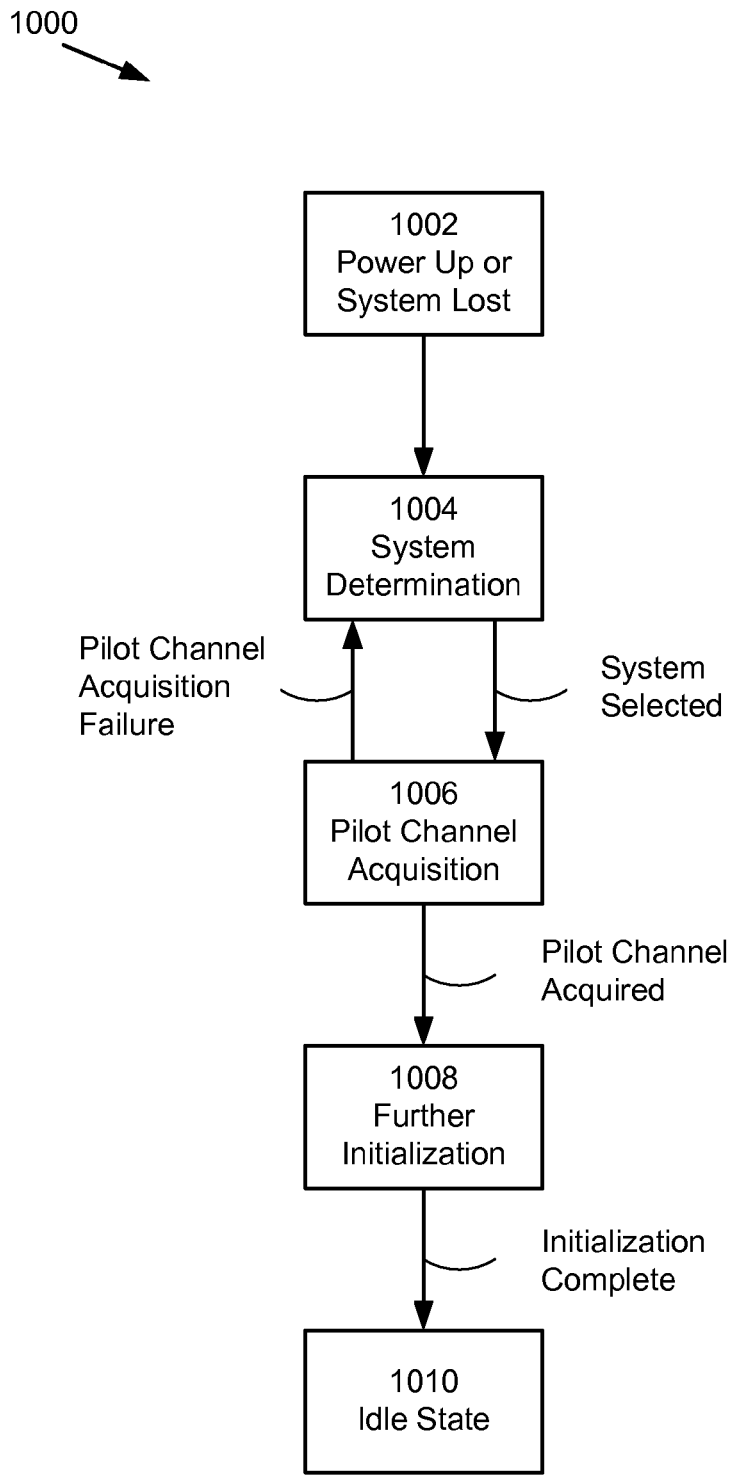
FIG. 10 illustrates a state change diagram for a mobile wireless device when acquiring a basic association with a wireless network.

In a CDMA2000 system, the mobile wireless device 102 (equivalently the mobile station 302) can declare a pilot acquisition failure condition when the mobile wireless device 102 cannot acquire the pilot within a pre-determined period of time. The pre-determined period of time can be set by the wireless network and can be approximately 15 seconds. When the pilot is lost, the mobile wireless device 102 can enter a system determination mode to reacquire the wireless network. The same system determination mode process can be used when the mobile wireless device 102 is initially powered on. FIG. 10 illustrates a state transition diagram for the mobile wireless device 102 that can occur when pilot acquisition failure occurs. Initially, in state 1002, the mobile wireless device 102 can be not associated with a wireless network, which can occur upon power on startup or after the mobile wireless device 102 loses connection with a system with which the mobile wireless device 102 was previously associated. The mobile wireless device 102 can enter a system determination state 1004 in which the mobile wireless device 102 can select a wireless system type with which to associate. Different wireless networks can use different communications technologies, such as GSM, UMTS, CDMA2000, LTE, etc. The mobile wireless device 102 can select among several different wireless communication technologies that it can support.

When a system is selected, the mobile wireless device 102 can enter a pilot channel acquisition state 1006. The mobile wireless device 102 can search for pilot signals from one or more radio sectors in a wireless network using one or more antennas and associated receive signal chains contained within the mobile wireless device 102. In one embodiment, the mobile wireless device 102 can measure received signal levels through both a first antenna and through a second antenna. When the measured received signal level through the first antenna falls below a first pre-determined threshold and when the measured received signal level through the second antenna exceeds the measured received signal level through the first antenna by at least a second pre-determined threshold, the mobile wireless device 102 can attempt to acquire the pilot through the second antenna. Thus, the mobile wireless device 102 can use the second antenna, when signals received through the first antenna are too weak to acquire the pilot and the signals received through the second antenna are stronger than the signals received through the first antenna by a pre-determined amount. When the mobile wireless device 102 fails to acquire a pilot using the second antenna, the mobile wireless device 102 can enable full receive diversity to receive signals through both the first antenna and the second antenna (and their respective associated receive signal chains) simultaneously. Combining signals from both antennas can improve pilot acquisition, and using both antennas selectively can limit power consumption to necessary circumstances.

When pilot channel acquisition fails, the mobile wireless device 102 can return to the system determination state 1004 and select a system again. When pilot channel acquisition succeeds, the mobile wireless device 102 can proceed through further initialization states (summarized in the further initialization state 1008 of FIG. 10). When initialization completes, the mobile wireless device 102 can enter the idle state 1010.

Figure 11:
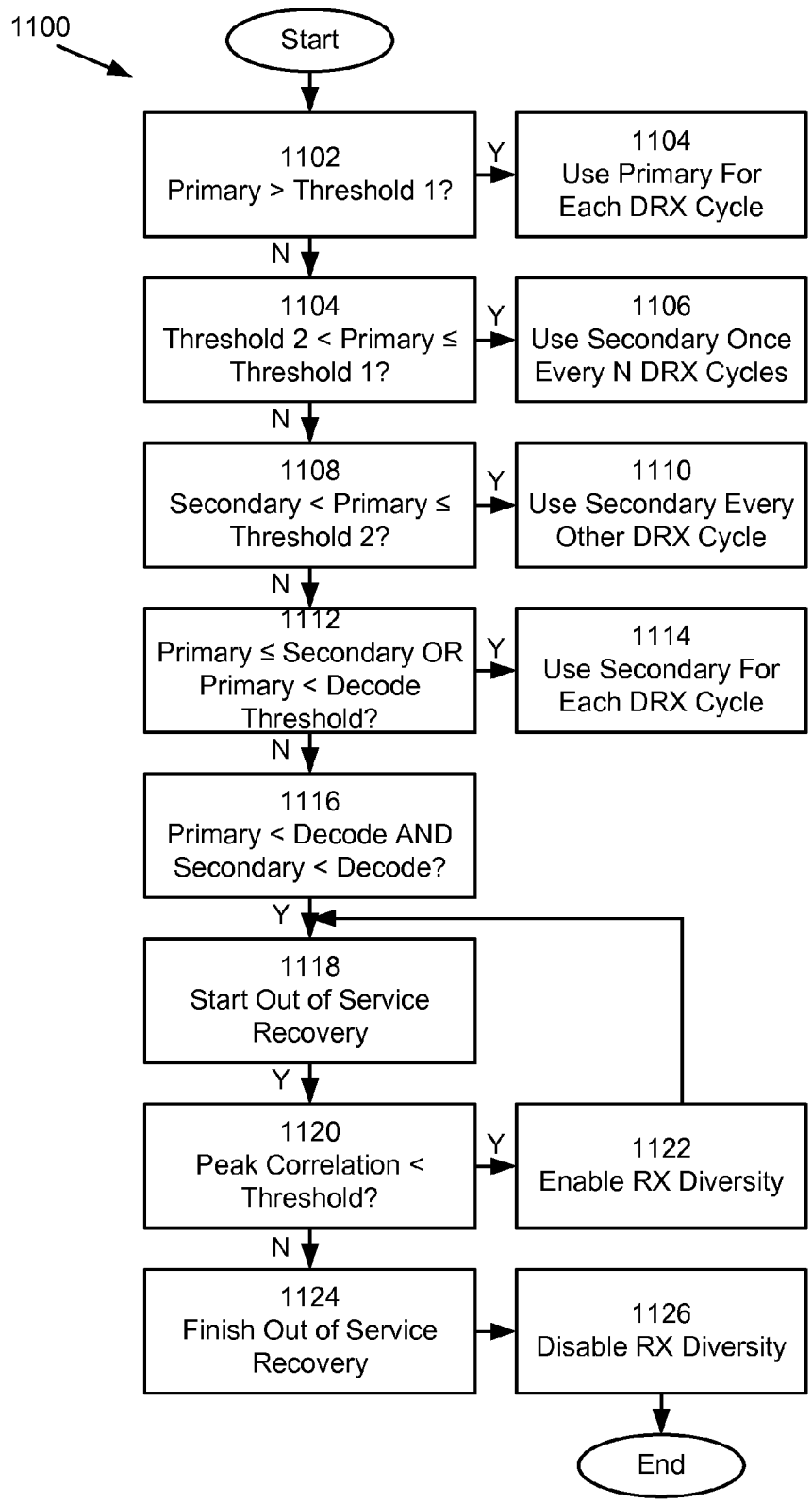
FIG. 11 illustrates an embodiment of a method to adapt receive diversity in a mobile wireless device.

FIG. 11 illustrates a representative embodiment of a method 1100 to adapt use of multiple antennas and associated receive signal chains in a mobile wireless device 102. Initially, the mobile wireless device 102 can operate in a wireless network and can by default use one of the antennas and an associated receive signal chain (e.g. a primary antenna). The mobile wireless device 102 can determine a signal characteristic, such as measuring a receive signal power, through the primary antenna. Measurements can be taken during different time intervals spaced apart, such as during a series of discontinuous reception (DRX) cycles. The mobile wireless device 102 can average the measured received signal across a moving window, thereby smoothing out instantaneous measured changes in receive signal power. The mobile wireless device 102 can, in step 1102, compare the moving average measured received signal power through the primary antenna (and associated receive signal chain) to a first predetermined threshold. When the average measured received signal power exceeds the first pre-determined threshold, the mobile wireless device 102 can use signals received through the primary antenna in step 1104. For sufficiently strong received signals, the mobile wireless device 102 can rely on signals received through the primary antenna, enabling an associated receive signal chain for the primary antenna and disabling other receive signal chains associated with other antennas to limit battery power consumption.

When the average measured receive signal power from the primary antenna falls below the first pre-determined threshold, as determined in step 1102, the mobile wireless device 102 can compare the average measured receive signal power from the primary antenna to a second pre-determined threshold in step 1104. When the average measured receive signal power from the primary antenna exceeds the second pre-determined threshold (and falls below the first pre-determined threshold), the mobile wireless device 102 can use the secondary antenna for measuring receive signal power for select DRX cycles as indicated in step 1106. The mobile wireless device 102 can switch unequally between the primary antenna and the secondary antenna during a series of successive DRX cycles when measuring receive signal power. Within a range of values between the first and second pre-determined thresholds, the mobile wireless device 102 can use the primary antenna more frequently for higher values of average measured receive signal power through the primary antenna. As the average measured receive signal power through the primary antenna decreases, which can indicate a weaker signal from the primary antenna, the mobile wireless device 102 can increase use of the secondary antenna.

When the average measured receive signal power through the primary antenna decreases below the second pre-determined threshold, and when the average measured receive signal power through the primary antenna exceeds an average measured receive signal power through the secondary antenna, the mobile wireless device 102 can use signals from both the primary antenna and the secondary antenna equally as indicated in step 1110. In step 1112, the mobile wireless device 102 can determine if a pre-determined decoding threshold for signals received through the primary antenna is not met. When the signals received through the primary antenna fall below a pre-determined decoding threshold (or equivalently a measured decoding error rate exceeds a pre-determined decoding error rate threshold), the mobile wireless device 102 can switch to using signals received through the secondary antenna during each DRX cycle as shown in step 1114. Alternatively, in step 1112, when the mobile wireless device 102 determines that an average measured receive signal through the secondary antenna exceeds the average measured receive signal through the primary antenna, the mobile wireless device 102 can use the secondary antenna for each DRX cycle.

In step 1116, the mobile wireless device 102 can determine an out of service condition exists when decoding signals received through both the primary antenna and through the secondary antenna fall below a pre-determined decoding threshold. When unable to decode properly signals received through either antenna, the mobile wireless device 102 can start an out of service recovery process in step 1118. The mobile wireless device 102 can search for pilot signals transmitted by radio sectors in the wireless network and compare correlations of the received signals to a pre-determined correlation threshold in step 1120. If the measured peak correlation for signals received through one antenna falls below the pre-determined correlation threshold, then the mobile wireless device 102 can enable full receive diversity in step 1122 by receiving and correlating signals received through more than one antenna. When the measured peak correlation of received signals exceeds the pre-determined correlation threshold, the method can continue to complete the out of service recovery process in step 1124. The out of service recovery process can include identifying a wireless network cell/sector with which to connect and camping on that cell/sector. When the mobile wireless device 102 has camped on a cell/sector, the mobile wireless device 102 can disable receiver diversity in step 1126, and the method can end.

The method 1100 outlined in FIG. 11 includes two separate sets of steps, a first set of steps in which the mobile wireless device 102 can determine use of a primary antenna and a secondary antenna during DRX cycles based on average measured received signal power through the primary antenna and the secondary antenna, and a second set of steps in which the mobile wireless device 102 can enable selectively multiple antennas during an out of service condition. The first set of steps is summarized in steps 1102 to 1114. The second set of steps is summarized in steps 1116 to 1126. In some embodiments of the method, the first and second sets of steps can be used individually and independently, while in others the two sets of steps can be used in combination. Each set of steps, separately or in combination, can be performed repeatedly by the mobile wireless device 102. For example, the mobile wireless device 102, after starting and completing recovery from an out of service condition in steps 1118 to 1126 with antenna receiver diversity enabled, can return to measuring the signal strength for the primary and secondary antennas with antenna receiver diversity disabled in steps 1102 and following.

Figure 12:
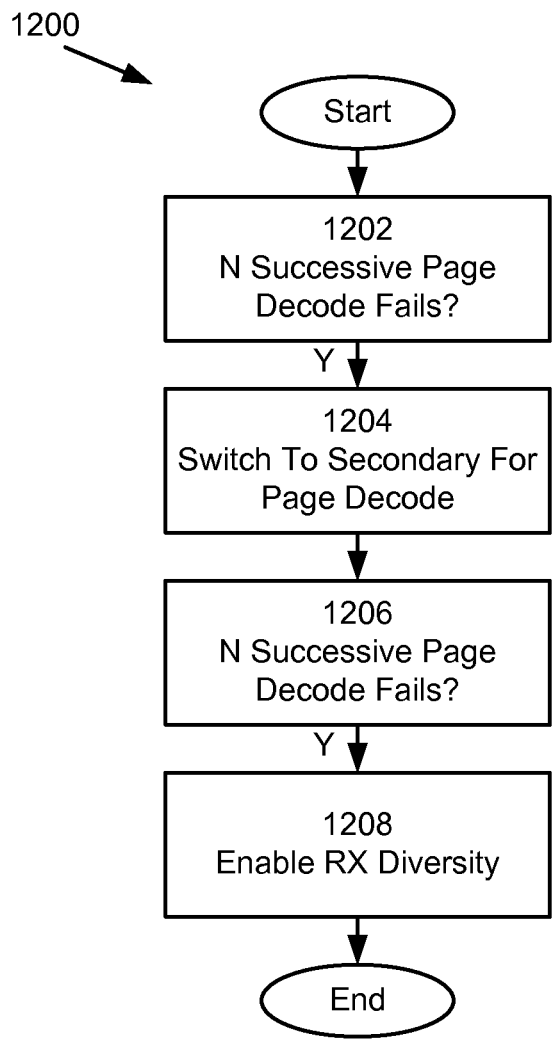
FIG. 12 illustrates an embodiment of a method to select receive diversity for page decoding in a mobile wireless device.

FIG. 12 illustrates a method 1200 for selectively enabling multiple antenna receiver diversity in a mobile wireless device 102. Initially, the mobile wireless device 102 can be using a primary antenna and an associated primary receive signal chain to receive and process signals for decoding. In step 1202, the mobile wireless device 102 can determine when decoding of a paging channel fails in N successive tries for signals received through the primary antenna. In step 1204, the mobile wireless device 102 can switch from using the primary antenna to receiving signals for paging channel decoding through a secondary antenna and associated secondary receive signal chain. In step 1206, the mobile wireless device 102 can determine when decoding of the paging channel also fails in N tries for signals received through the secondary antenna. As neither the primary antenna nor the secondary antenna alone can provide proper paging channel decoding, in step 1208, the mobile wireless device 102 can enable full receive diversity by receiving signals through both the primary and secondary antennas. The mobile wireless device 102 can combine the signals received through both the primary antenna and the secondary antenna to improve decoding of the paging channel. The method 1200 illustrated in FIG. 12 can be used in different wireless networks that use different wireless communication standards. In one embodiment, the method 1200 can be applied to a mobile station 302 operating in a CDMA2000 wireless network 300 for reception of a quick paging channel (QPCH) or a paging channel (PCH). In another embodiment, the method 1200 can be applied to user equipment 202 operating in a UMTS wireless network 200 for reception of a paging indicator channel (PICH).

Figure 13:
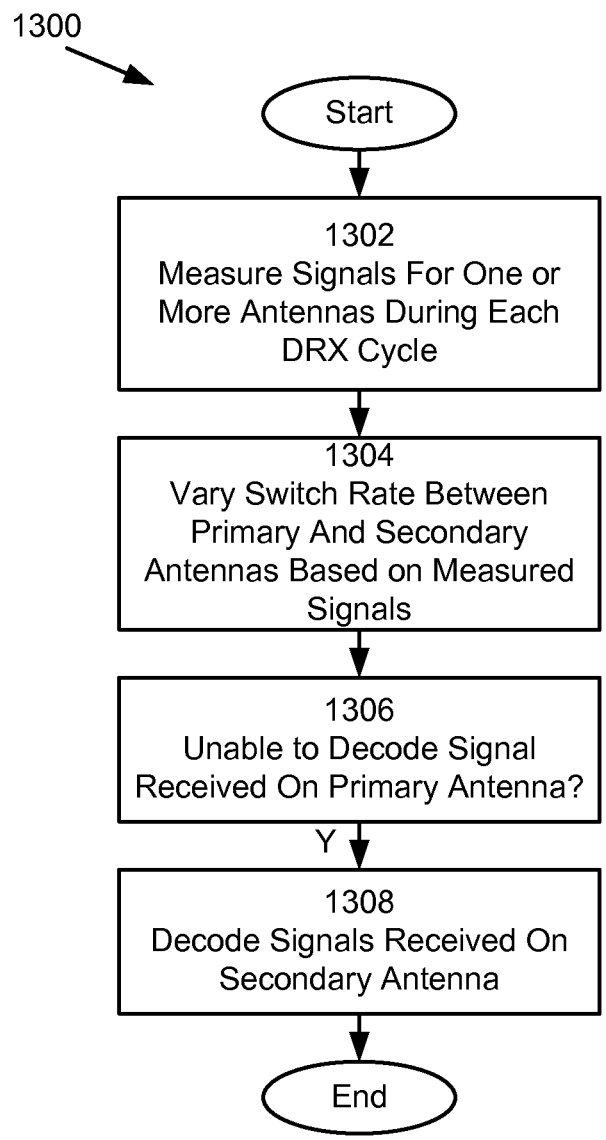
FIG. 13 illustrates an embodiment of a method to select receive diversity for signal decoding in a mobile wireless device.

FIG. 13 illustrates a representative method 1300 to switch between multiple antennas in a mobile wireless device 102. In step 1302, the mobile wireless device 102 can measure signals received from one or more antennas during each cycle in a series of successive discontinuous reception (DRX) cycles. In an embodiment, the measured signals can be averaged over multiple DRX cycles. In step 1304, the mobile wireless device 102 can vary a switch rate between use of a primary antenna and a secondary antenna based on the measured signals. In an embodiment, the mobile wireless device 102 can select to receive and measure signals more frequently through an antenna with stronger measured signal strength. The mobile wireless device 102 can switch between receiving signals through the primary antenna and the secondary antenna at a switch rate that depends on the signal measured through one or more of the antennas, e.g. based on the primary antenna received signal strength. In step 1306, the mobile wireless device 102 can determine whether signals received through the primary antenna can be properly decoded. When the signals received through the primary antenna cannot be properly decoded, the mobile wireless device 102 can switch to decoding signals received through the secondary antenna in step 1308.

Figure 14:
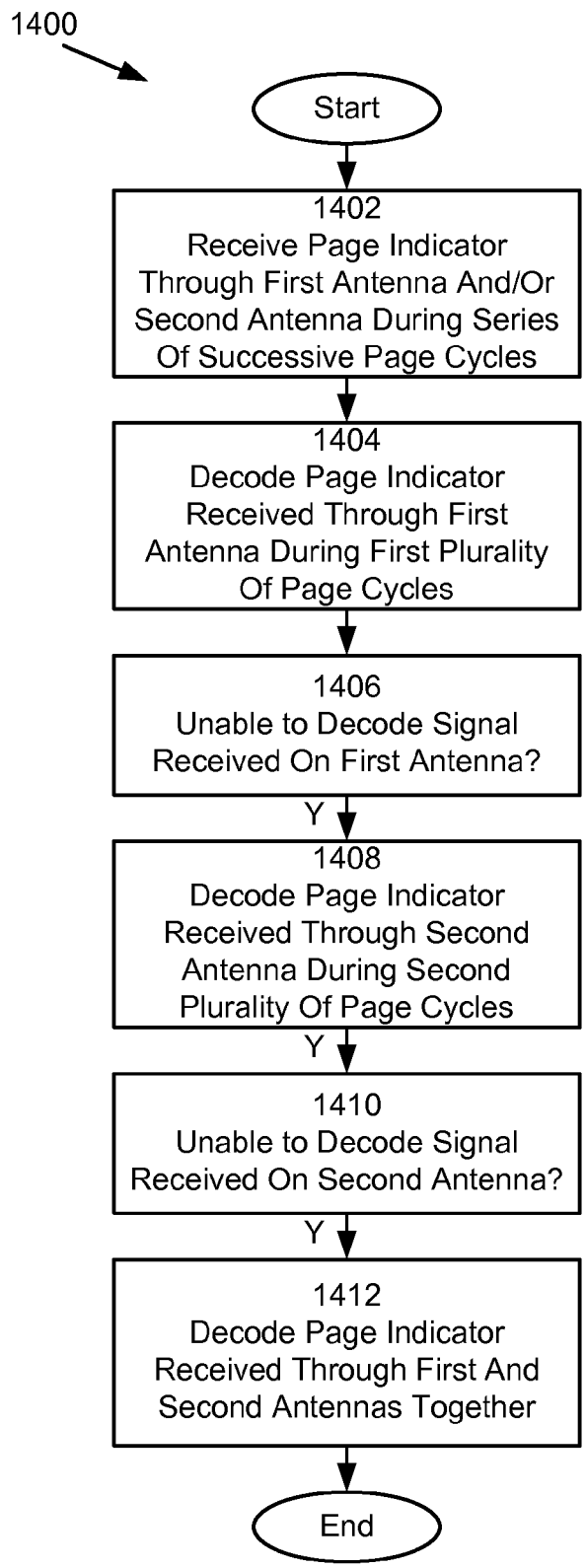
FIG. 14 illustrates a further embodiment of a method to select receive diversity for page decoding in a mobile wireless device.

FIG. 14 illustrates a representative method 1400 to use multiple antennas for page decoding in a mobile wireless device 102. In step 1402, the mobile wireless device 102 can receive a page indicator through a first antenna and also can receive the page indicator though a second antenna during a series of successive page cycles. In step 1404, the mobile wireless device 102 can decode the page indicator received through the first antenna during a first plurality of page cycles in the series of successive page cycles. In step 1406, the mobile wireless device 102 can determine whether it can decode the signal received through the first antenna. When the signal received through the first antenna cannot be decoded, the mobile wireless device 102 in step 1408 can decode the page indicator received through the second antenna during a second plurality of page cycles in the series of successive page cycles. In step 1410, the mobile wireless device 102 can determine whether it can decode the signal received through the second antenna. When the signal received through the second antenna cannot be decoded, the mobile wireless device 102 in step 1412 can decode the page indicator received through the first antenna and through the second antenna together, thereby enabling receiver diversity to improve page decoding.

Figure 15:
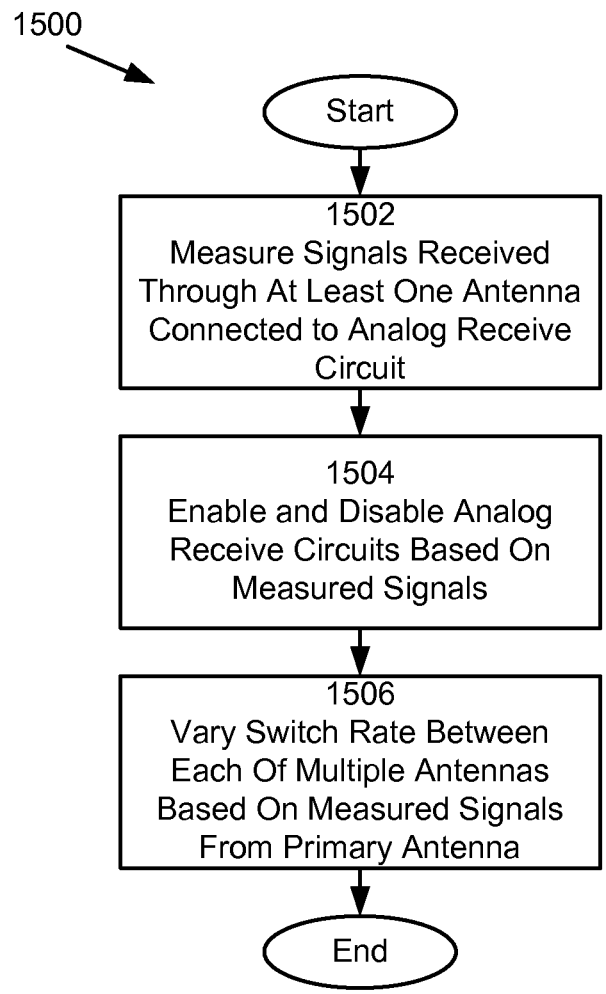
FIG. 15 illustrates a further embodiment of a method to select receive diversity based on measured received signals.

FIG. 15 illustrates a representative method to use multiple antennas and associated receive signal circuitry in a mobile wireless device 102 selectively to conserve battery power. In step 1502, the mobile wireless device 102 can measure signals received through at least one antenna connected to an analog receive circuit. In step 1504, the mobile wireless device 102 can enable and disable analog receive circuits in the mobile wireless device 102 based on the measured received signals. In some embodiments, the mobile wireless device 102 can selectively enable only the analog receive circuits through a single antenna at a time. In other embodiments, the mobile wireless device 102 can enable multiple antennas to provide full receive diversity for improved reception and/or decoding of signals in areas of weak signal coverage. In step 1506, the mobile wireless device 102 can vary a switch rate between each of the multiple antennas based on measured signals received through a primary antenna. As the measured signal through the primary antenna varies, the mobile wireless device 102 can selectively enable or disable additional antennas to improve reception and decoding performance.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of measuring signals received through a plurality of antennas in a mobile wireless device in communication with a wireless network, comprising:
measuring signals received through at least one of a primary antenna and a secondary antenna during each cycle in a series of discontinuous reception cycles, wherein measuring signals includes calculating a moving average of signal strength for a pilot signal received from a radio station in the wireless network;
selecting a switch rate that controls a number of the series of discontinuous reception cycles for which the primary antenna is designated as receiving the measured signals and a second number of the series of discontinuous reception cycles for which the secondary antenna is designated as receiving the measured signals;
varying the switch rate based on the measured received signals, wherein varying the switch rate is based at least in part on calculated moving averages for pilot signals received through the primary antenna; and
when unable to decode successfully a signal received on the primary antenna, switching to decode signals received on the secondary antenna.

2. The method as recited in claim 1, further comprising:
setting the switch rate in the mobile wireless device to receive signals solely through the primary antenna when the calculated moving average of the pilot signal received through the primary antenna equals or exceeds a first pre-determined threshold;
setting the switch rate in the mobile wireless device to receive signals from both the primary and secondary antennas unequally when the calculated moving average of the pilot signal received through the primary antenna equals or exceeds a second pre-determined threshold and falls below the first pre-determined threshold; and
setting the switch rate in the mobile wireless device to receive signals from both the primary and secondary antennas equally when the calculated moving average of the pilot signal received through the primary antenna falls below the second pre-determined threshold.

3. The method as recited in claim 2, further comprising:
setting the switch rate in the mobile wireless device to alternate receiving signals between the primary antenna and the secondary antenna based on a length of time of each cycle in the series of discontinuous reception cycles.

4. The method as recited in claim 3, wherein the switch rate increases a frequency of receiving signals through the secondary antenna as the length of time of each cycle in the series of discontinuous reception cycles increases.

5. The method as recited in claim 2, wherein the mobile wireless device varies the switch rate between the primary antenna and the secondary antenna during the series of discontinuous reception cycles when operating in at least one of a CELL_IDLE state, a URA_PCH state and a CELL_PCH state in a UMTS wireless network.

6. The method as recited in claim 1, further comprising:
when unable to decode successfully a signal received on the primary antenna and unable to decode successfully a signal received on the secondary antenna, initiating an out of service recovery process.

7. The method as recited in claim 6, further comprising:
after initiating the out of service recovery process,
searching for available cells in the wireless network by measuring correlation peaks of signals received on the primary antenna from one or more cells;
when the measured correlation for the one or more cells falls below a third pre-determined threshold, enabling receiver diversity by measuring correlation peaks for signals received on both the primary antenna and the secondary antenna.

8. The method as recited in claim 7, further comprising: determining an out of service condition based on signals received through the primary antenna when the moving average pilot signal strength measured for the primary antenna exceeds the moving average pilot signal strength measured for the secondary antenna; and determining an out of service condition based on signals received through the secondary antenna when the moving average pilot signal strength measured for the secondary antenna exceeds the moving average pilot signal strength measured for the primary antenna.

9. A method for managing receiver diversity in a mobile wireless device, the method comprising:
selecting a switch rate that controls a number of a series of successive pages for which a first antenna is designated as receiving a page indicator on a page indicator channel and a second number of the series of successive pages for which a second antenna is designated as receiving the page indicator on the page indicator channel;

receiving the page indicator on the page indicator channel during the number of the series of successive pages through the first antenna;

receiving the page indicator on the page indicator channel during the second number of the series of successive pages through the second antenna;

decoding the page indicator received through the first antenna for a first plurality of successive page cycles;

when decoding fails for signals received through the first antenna, decoding the page indicator received through the second antenna for a second plurality of successive page cycles; and when decoding fails for signals received through the first and second antennas individually, decoding the page indicator received through both the first and second antennas together.

10. The method as recited in claim 9, further comprising:

enabling a first receive signal chain and disabling a second receive signal chain in the mobile wireless device when receiving signals through the first antenna;

enabling the second receive signal chain and disabling the first receive signal chain in the mobile wireless device when receiving signals through the second antenna; and enabling both the first and second receive signal chains in the mobile wireless device when receiving signals through both the first antenna and the second antenna.

11. A mobile wireless device in communication with a wireless network, comprising:

a processor;

a wireless transceiver arranged to facilitate communication with the wireless network;

a primary antenna connected to a first receive signal circuit; and a secondary antenna connected to a second receive signal circuit;

wherein the mobile wireless device is arranged to:

measure signals received through at least one of the primary antenna connected to the first receive signal circuit and the secondary antenna connected to the second receive signal circuit during each cycle in a series of discontinuous reception cycles, wherein measuring signals includes calculating a moving average of signal strength for a pilot signal received from a radio station in the wireless network;

select a switch rate that controls a number of the series of discontinuous reception cycles for which the primary antenna is designated as receiving the measured signals and a second number of the series of discontinuous reception cycles for which the secondary antenna is designated as receiving the measured signals;

vary the switch rate based on the measured received signals, wherein varying the switch rate is based at least in part on calculated moving averages for pilot signals received through the primary antenna; and when unable to decode successfully a signal received on the primary antenna, switch to decode signals received on the secondary antenna.

12. The mobile wireless device as recited in claim 11, wherein the wireless transceiver is further arranged to:

set the switch rate in the mobile wireless device to receive signals solely through the primary antenna when the calculated pilot signal strength moving average received through the primary antenna equals or exceeds a first pre-determined threshold;

set the switch rate in the mobile wireless device to receive signals from both the primary antenna and the secondary antenna unequally when the calculated pilot signal strength moving average received through the primary antenna equals or exceeds a second pre-determined threshold and falls below the first pre-determined threshold; and set the switch rate in the mobile wireless device to receive signals from both the primary antenna and the secondary antenna equally when the calculated pilot signal strength moving average received through the primary antenna falls below the second pre-determined threshold.

13. The mobile wireless device as recited in claim 12, wherein the wireless transceiver is further arranged to set the switch rate in the mobile wireless device between receiving signals through the primary antenna and through the secondary antenna based on a length of time of each cycle in the series of discontinuous reception cycles.

14. The mobile wireless device as recited in claim 13, wherein the switch rate in the mobile wireless device between receiving signals through the primary antenna and through the secondary antenna decreases a frequency of use of the secondary antenna as the length of time of each cycle in the series of discontinuous reception cycles increases.

15. The mobile wireless device as recited in claim 12, wherein the processor is arranged to initiate an out of service recovery process when unable to decode successfully a signal received on the primary antenna and unable to decode successfully a signal received on the secondary antenna.

16. The mobile wireless device as recited in claim 15, wherein the transceiver is further arranged to search for available cells in the wireless network by measuring correlation peaks of signals received on the primary antenna from one or more cells; and when the measured correlation for the one or more cells falls below a third pre-determined threshold, enable receiver diversity by measuring correlation peaks for signals received on both the primary antenna and the secondary antenna.

17. The mobile wireless device as recited in claim 16, wherein the processor is further arranged to determine an out of service condition based on signals received through the primary antenna when the calculated pilot signal strength moving average measured for the primary antenna exceeds the calculated pilot signal strength moving average measured for the secondary antenna;

determine an out of service condition based on signals received through the secondary antenna when the calculated pilot signal strength moving average measured for the secondary antenna exceeds the calculated pilot signal strength moving average measured for the primary antenna.

18. A non-transitory computer program product for storing executable computer code for measuring receive signals in a mobile wireless device in communication with a wireless network, the computer program product comprising:

computer code for measuring signals received through at least one of a plurality of antennas, each antenna connected to a corresponding analog receive signal circuit, wherein measuring signals includes calculating a moving average of signal strength for a pilot signal received from a radio station in the wireless network;

computer code for enabling and disabling the analog receive signal circuits based on the measured signals; computer code to select a switch rate that controls a number of a series of discontinuous reception cycles for which each antenna is disabled or enabled; computer code for varying the switch rate between each antenna in the plurality of antennas and between corresponding analog receive signal circuits based at least on the measured signals received from a primary antenna in the plurality of antennas, wherein varying the switch rate is based at least in part on the calculated pilot signal strength moving averages.

19. The non-transitory computer readable medium as recited in claim 18, further comprising:

computer code for setting the switch rate in the mobile wireless device to receive signals solely through the primary antenna when the calculated pilot signal strength moving average received through the primary antenna equals or exceeds a first pre-determined threshold;

computer program code for setting the switch rate in the mobile wireless device to receive signals from both the primary antenna and a secondary antenna unequally when the calculated pilot signal received through the primary antenna equals or exceeds a second pre-determined threshold and falls below the first predetermined threshold; and computer program code for setting the switch rate in the mobile wireless device to receive signals from both the primary and secondary antennas equally when the calculated pilot signal strength moving average received through the primary antenna falls below the second pre-determined threshold.

20. The non-transitory computer readable medium as recited in claim 19, further comprising:

computer program code for setting the switch rate in the mobile wireless device to receive signals through the primary antenna and through the secondary antenna based at least on a length of time of each cycle in a series of discontinuous reception cycles.

21. The non-transitory computer readable medium as recited in claim 20, further comprising:

computer program code for determining an out of service condition for the mobile wireless device by measuring correlation peaks for signals received only through the primary antenna, when the moving average signal strength of the pilot signal measured from the primary antenna is greater than measured from the secondary antenna;

measuring correlation peaks for signals received only through the secondary antenna, when the moving average signal strength of the pilot signal measured from the secondary antenna is greater than measured from the primary antenna; and measuring correlation peaks for signals received through both the primary antenna and the secondary antenna, when measured correlation peaks for signals received through the primary antenna alone and through the secondary antenna alone each fall below a pre-determined threshold.

* * * * *